(12) United States Patent
Tennant et al.

(10) Patent No.: US 9,707,700 B2
(45) Date of Patent: Jul. 18, 2017

(54) TILE SAW

(71) Applicant: AC (MACAO COMMERCIAL OFFSHORE) LIMITED, Macau (MO)

(72) Inventors: C. Scott Tennant, Clemson, SC (US); Michael Hart, Anderson, SC (US); David Dutterer, Belton, SC (US)

(73) Assignee: TTI (MACAO COMMERCIAL OFFSHORE) LIMITED, Macau (MO)

( * ) Notice: Subject to any disclaimer, the term of this patent is extended or adjusted under 35 U.S.C. 154(b) by 0 days.

(21) Appl. No.: 14/859,409

(22) Filed: Sep. 21, 2015

(65) Prior Publication Data

US 2017/0080602 A1 Mar. 23, 2017

(51) Int. Cl.
*B28D 1/04* (2006.01)
(52) U.S. Cl.
CPC .................. *B28D 1/047* (2013.01)
(58) Field of Classification Search
CPC ........................................... B28D 1/047
USPC ...................................... 125/13.01
See application file for complete search history.

(56) References Cited

U.S. PATENT DOCUMENTS

| | | | |
|---|---|---|---|
| 3,311,103 A | 3/1967 | Simson | |
| 5,179,886 A * | 1/1993 | Rathje, Jr. ............ | B23D 45/025 83/471.3 |
| 6,101,914 A | 8/2000 | Brunson et al. | |
| 6,276,990 B1 * | 8/2001 | Greenland ............. | B23D 47/02 125/13.03 |
| 6,752,140 B1 * | 6/2004 | Fuhrman ................ | B23D 45/02 125/13.01 |
| 6,758,123 B2 | 7/2004 | Svetlik et al. | |
| 6,883,511 B1 | 4/2005 | Tsao | |
| 6,932,075 B1 * | 8/2005 | Tsao .......................... | B27B 5/24 125/13.01 |
| 7,552,725 B2 | 6/2009 | Chen et al. | |
| 8,342,610 B2 | 1/2013 | Marsic et al. | |
| 8,656,902 B2 * | 2/2014 | Wei ....................... | B23D 47/025 125/12 |
| 8,671,811 B2 * | 3/2014 | Rybka .................. | B23D 45/024 125/13.01 |
| 9,003,940 B2 * | 4/2015 | He .......................... | B27B 5/165 83/471.2 |

(Continued)

FOREIGN PATENT DOCUMENTS

EP 1785211 2/2012

*Primary Examiner* — George Nguyen
(74) *Attorney, Agent, or Firm* — Michael Best & Friedrich LLP

(57) ABSTRACT

A tile saw includes a base, and a table movably coupled to the base and moveable in a first plane between a first position and a second position to cut a workpiece. A blade assembly has a saw blade rotatable within a second plane that is perpendicular to the first plane to cut the workpiece as the table moves between the first position and the second position. The tile saw further includes a support arm fixedly coupling the blade assembly to the base via a support arm mount, and an adjustment mechanism received by the support arm mount and the base. The adjustment mechanism is movable between a first adjustment position and a second adjustment position to adjust the position of the saw blade. Adjusting the saw blade includes at least one of translating the saw blade to a third plane parallel to the second plane and pivoting the support arm to change the yaw of the saw blade.

12 Claims, 6 Drawing Sheets

(56) References Cited

U.S. PATENT DOCUMENTS

2004/0134324 A1* 7/2004 Sheddy ................ B23D 45/02
83/581
2014/0208915 A1 7/2014 He

* cited by examiner

TILE SAW

BACKGROUND

The present invention relates to power tools. Specifically, the present invention relates to tile saws.

Conventionally, power tile saws include a base which supports a table for supporting a workpiece. A blade assembly is coupled to the base for engaging the workpiece, such as tile or masonry stone. Typically, a structural member is coupled between the blade assembly and the base for supporting the blade assembly relative to the base. When scoring or cutting the workpiece with the blade assembly, the table is movable relative to the blade assembly such that a straight cut can be performed.

SUMMARY

In one aspect, the invention provides a tile saw including a base, and a table movably coupled to the base and moveable in a first plane between a first position and a second position to cut a workpiece. A blade assembly having a saw blade rotatable within a second plane is perpendicular to the first plane to cut the workpiece as the table moves between the first position and the second position. The tile saw further includes a support arm fixedly coupling the blade assembly to the base via a support arm mount, and an adjustment mechanism received by the support arm mount and the base. The adjustment mechanism is movable between a first adjustment position and a second adjustment position to adjust the position of the saw blade. Adjusting the saw blade includes at least one of translating the saw blade to a third plane parallel to the second plane and pivoting the support arm to change the yaw of the saw blade.

In another aspect, the invention provides a tile saw including a base, a table movably coupled to the base and moveable in a first plane between a first position and a second position to cut a workpiece, and a blade assembly having a saw blade rotatable within a second plane perpendicular to the first plane to cut the workpiece as the table moves between the first position and the second position. The tile saw further includes a support arm for supporting the blade assembly relative to the base, a support arm mount of the support arm to fixedly couple the blade assembly to the base, and a first elongated slot extending in a first direction. A stud is received by and rotatable within the first elongated slot and the base. The stud is moveable between a first adjustment position and a second adjustment position to adjust the position of the saw blade with respect to the base. A cam surface of the stud configured to impart a force to the inner periphery of the elongated slot when rotated. The tile saw further includes a second elongated slot extending in a second direction perpendicular to the first direction, and a bolt received by the second elongated slot and the base. The bolt translates in the second elongated slot to facilitate guiding the movement of the blade assembly with respect to the base.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. Use of "including" and "comprising" and variations thereof as used herein is meant to encompass the items listed thereafter and equivalents thereof as well as additional items. Use of "consisting of" and variations thereof as used herein is meant to encompass only the items listed thereafter and equivalents thereof. Unless specified or limited otherwise, the terms "mounted," "connected," "supported," and "coupled" and variations thereof are used broadly and encompass both direct and indirect mountings, connections, supports, and couplings.

Figure 1:
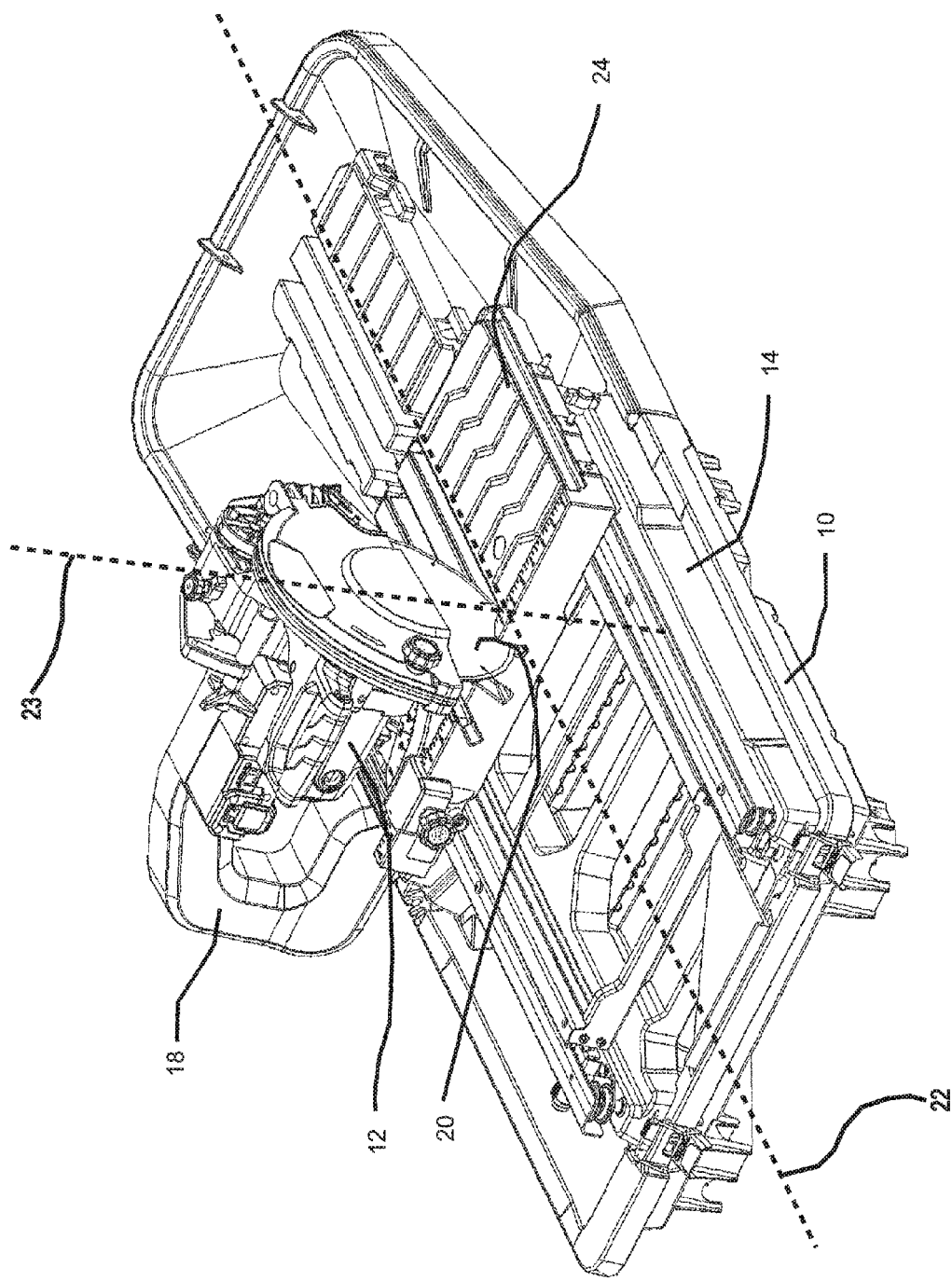
FIG. 1 is a perspective view of a tile saw in accordance with an embodiment of the invention.

FIG. 1 illustrates a tile saw 10 that can be used to accurately and quickly cut workpieces or construction materials such as ceramic, marble, or granite tiles and the like. As illustrated in FIG. 1, the tile saw 10 includes a saw unit 12, a base 14, and a saw arm 18 that supports the saw unit 12 relative to the base 14. The saw unit 12 includes a cutting blade 20 coupled to a motor and operable to cut the workpiece. The motor of the saw unit 12 is electrically-powered (line powered or battery powered) to selectively drive the cutting blade 20. In many constructions, the base 14 is positioned within a basin that contains a quantity of lubricant such as water that cools the cutting blade 20 and carries away debris removed during the cutting process.

Figure 2:
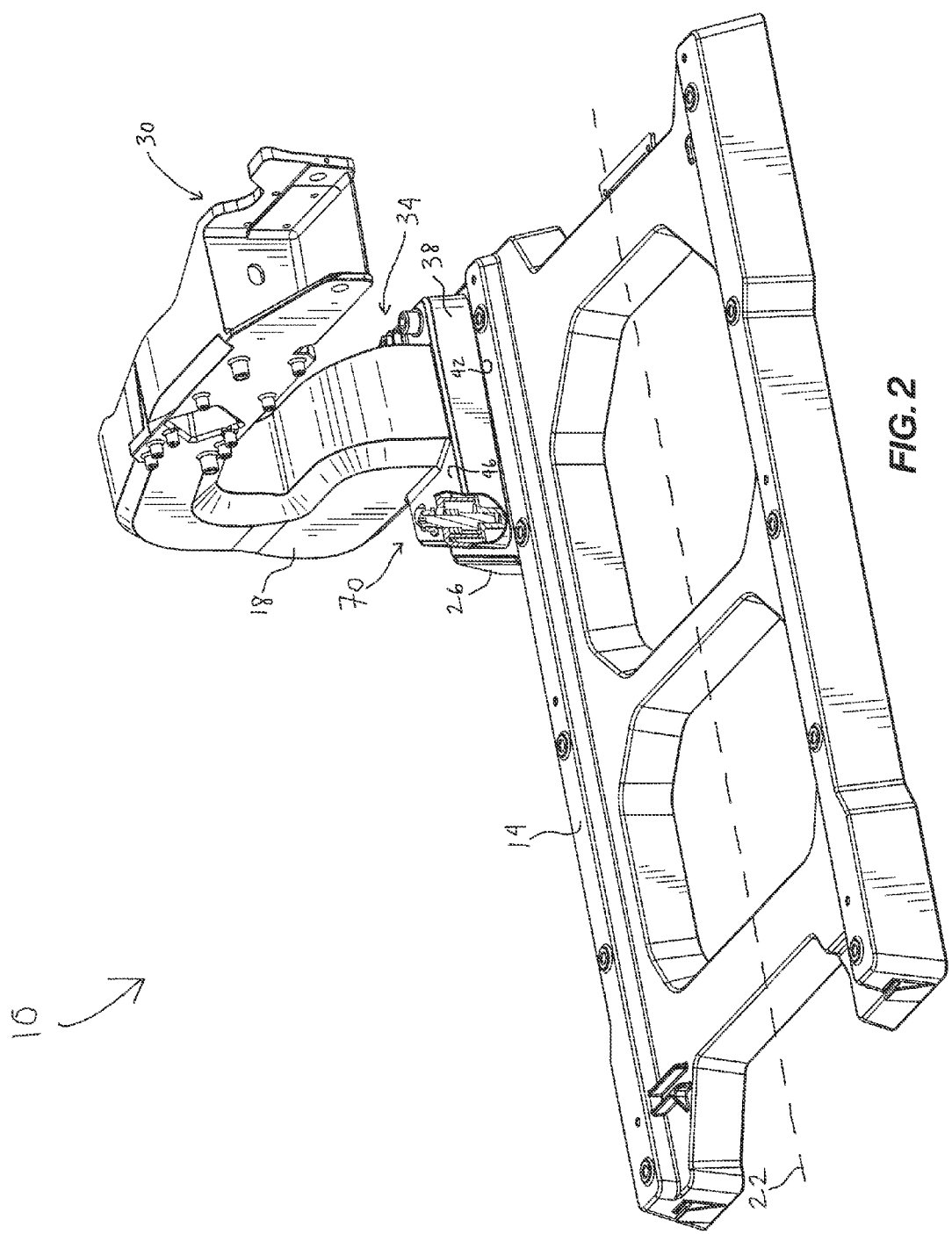
FIG. 2 is a perspective view of a tile saw with a partial cross-sectional view of an adjustment mechanism in accordance with an embodiment of the invention.
Figure 4:
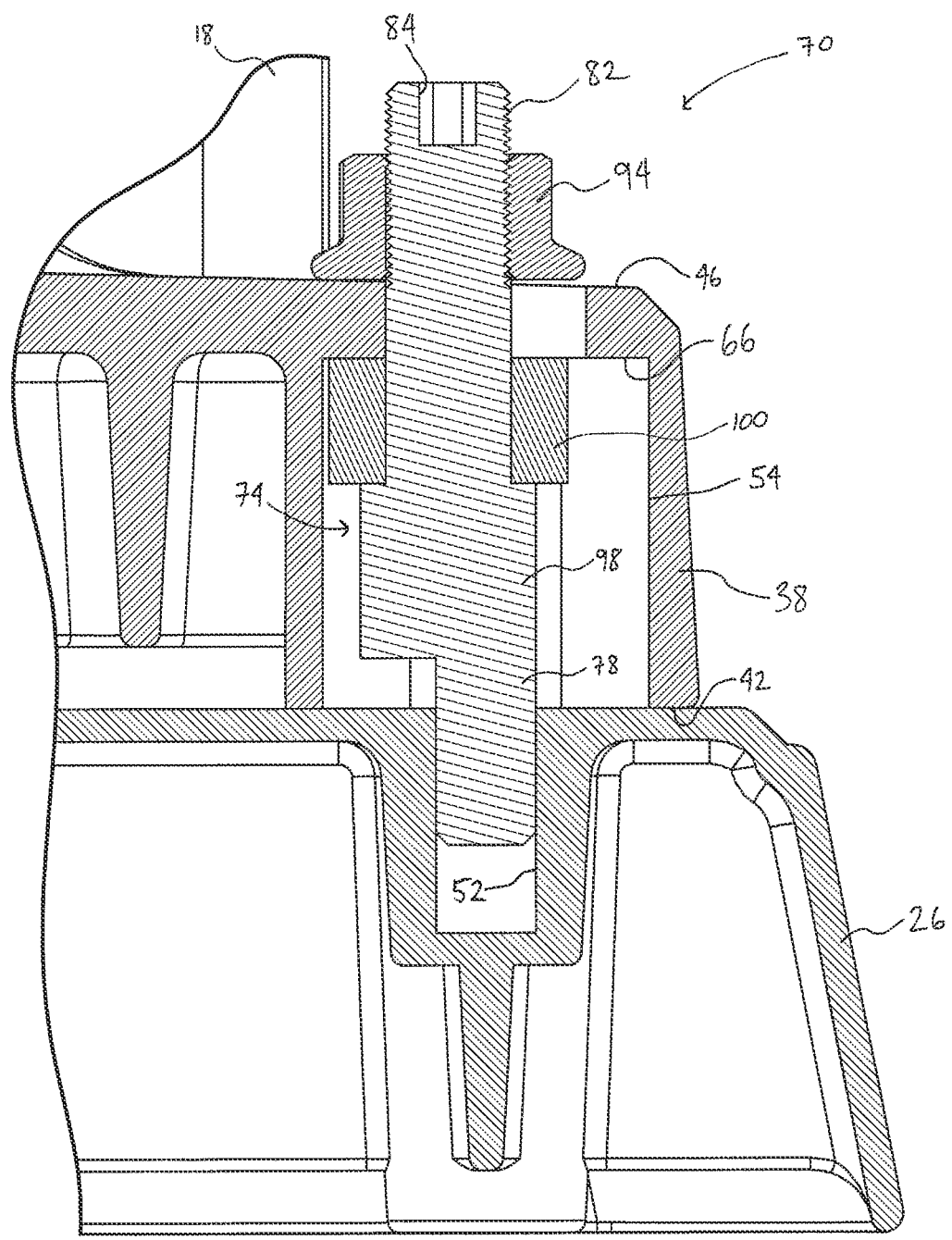
FIG. 4 is a cross-sectional view of a portion of the adjustment mechanism taken along line 4-4 of FIG. 3.
Figure 5:
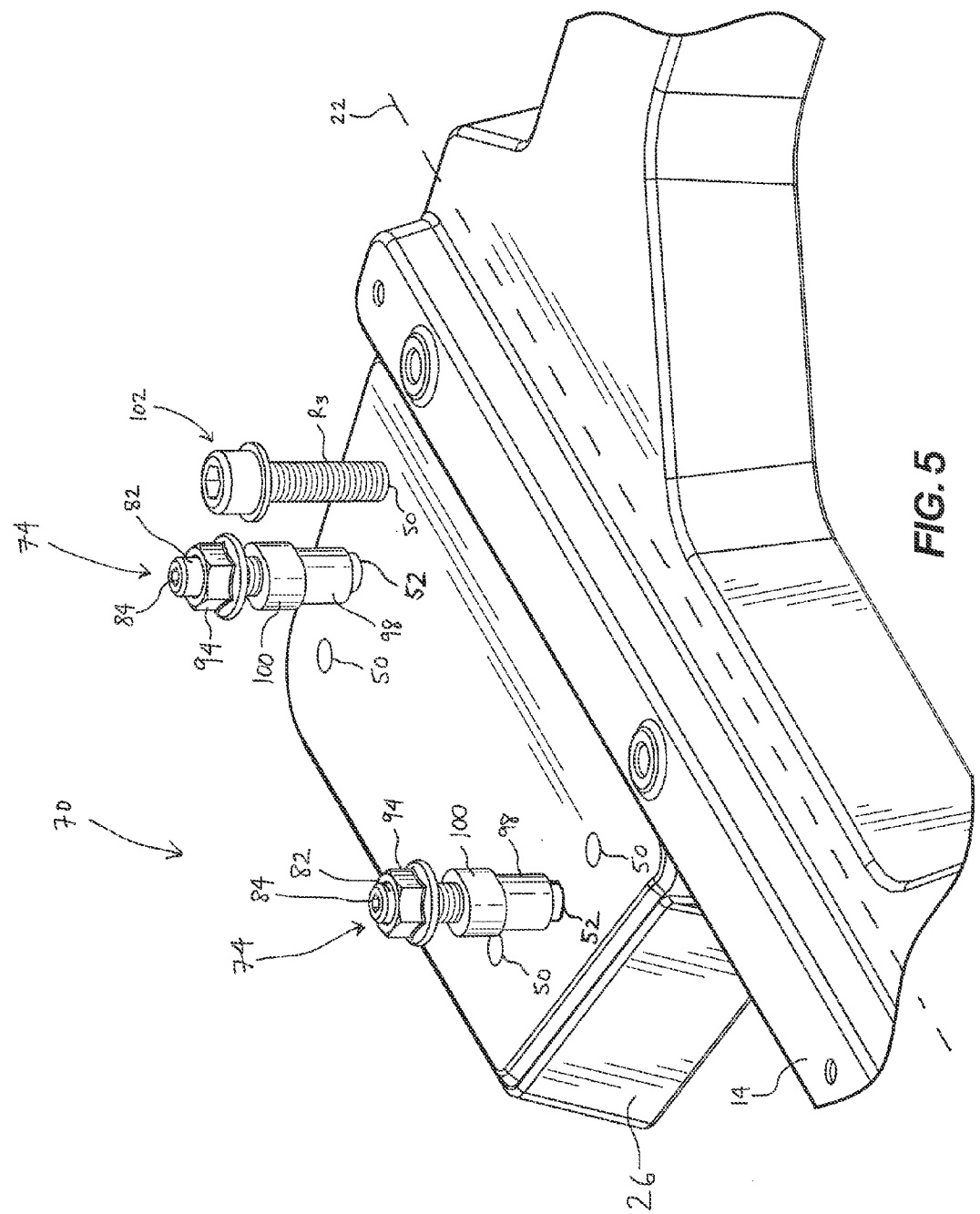
FIG. 5 is an enlarged perspective view of the adjustment mechanism of FIG. 2.

The base 14 is typically supported by a frame and a stand at a suitable working height. The base 14 is a structural component that includes guide elements that extend parallel to a longitudinal axis 22 (FIG. 2) of the tile saw 10 and cooperate to define a guide for a table 24. The guide elements of the base 14 are coupled to the table 24 which supports the material to be cut. The table 24 is moveable within a first or "horizontal" plane between a first position and a second position relative to the base 14 to cut the workpiece. As best illustrated in FIGS. 2 and 5, the base 14 also includes a platform 26 that includes four threaded apertures 50 and two bores 52 formed therein. As shown in FIG. 4, the two bores 52 have a smooth inner periphery. Although the illustrated embodiment illustrates four threaded apertures 50 and two bores 52 in the platform 26, other embodiments may include fewer or greater apertures 50 and bores 52.

With reference to FIG. 1, the saw unit 12 is rigidly supported by the saw arm 18 that fixedly attaches to the platform 26 of the base 14. Specifically, and as is better illustrated in FIG. 2, the saw arm 18 includes a first end 30 coupled to the saw unit 12 and a second end 34 having a saw arm mount 38 that directly couples to the platform 26 of the base 14. The saw arm mount 38 has a bottom surface 42 abutting the platform 26 and a top surface 46 opposite the bottom surface 42. The saw arm 18 is shaped to support the saw unit 12 over the base 14 in a position where the cutting blade 20 is able to cut a workpiece positioned on the table 24. The cutting blade 20 is supported for rotation within a second or "cutting" plane perpendicular to the first plane to cut the workpiece as the table 24 moves between the first and the second position. The second plane generally extends parallel to the longitudinal axis 22. Also, a vertical axis 23 is contained within the cutting plane and perpendicular to the longitudinal axis 22.

Figure 3:
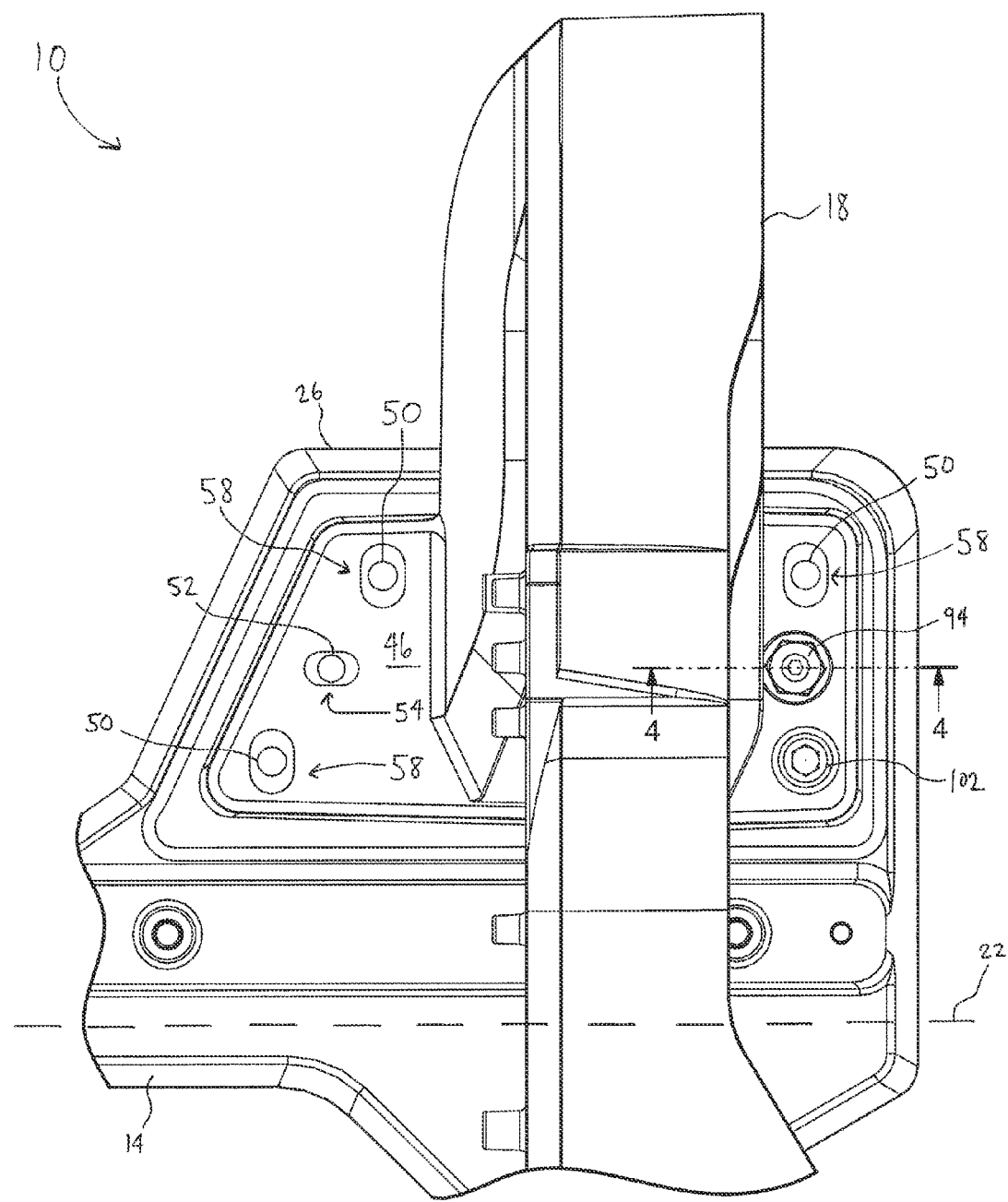
FIG. 3 is a top view of a portion of the tile saw of FIG. 2 including the adjustment mechanism.

With reference to FIG. 3, each bore 52 individually aligns with one of two elongated slots 54, whereas each aperture 50 individually aligns with one of four elongated slots 58. Although FIG. 4 only shows one of the elongated slots 54 extending through the saw arm mount 38, it is understood that the other one of the elongated slots 54 and each one of the elongated slots 58 also extend through the saw arm mount 38 in a similar manner. Specifically, each of the elongated slots 54, 58 extend from the bottom surface 42 to the top surface 46 of the saw arm mount 38. Each of the two elongated slots 54 extend in a first direction, and each of the four elongated slots 58 extend in a second direction perpendicular to the first direction. In this particular embodiment, the two elongated slots 54 extend in a direction parallel to the longitudinal axis 22. In other embodiments, each of the elongated slots 54, 58 may extend in a variety of different directions.

With reference to FIG. 4, the two elongated slots 54 include a shoulder 66 disposed between the bottom surface 42 and the top surface 46 of the saw arm mount 38. The shoulder 66 is formed to protrude inward from the inner periphery of the two elongated slots 54.

Figure 6:
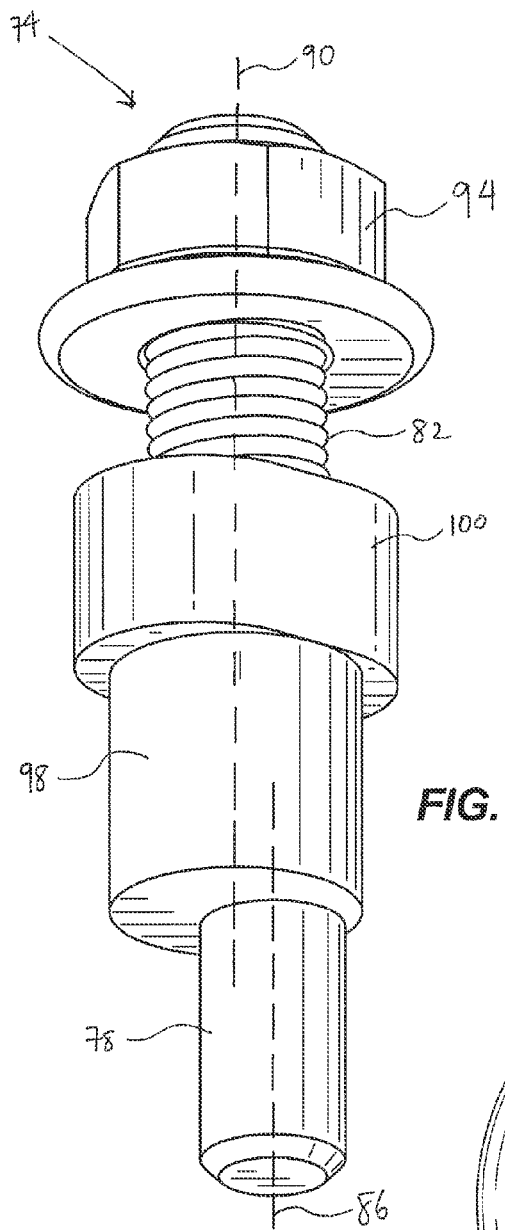
FIG. 6 is a perspective view of an adjustment fastener of the adjustment mechanism of FIG. 5.
Figure 7:
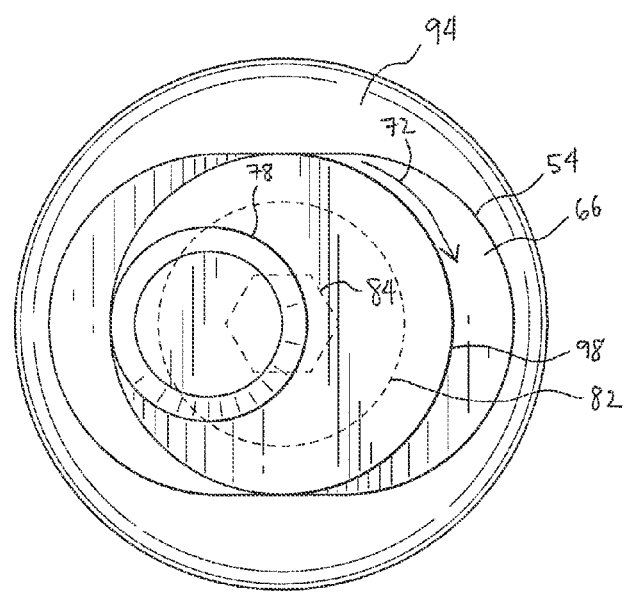
FIG. 7 is a bottom view of the adjustment fastener of FIG. 6.

With reference to FIGS. 5-7, an adjustment mechanism 70 includes two studs 74, four bolts 102, and two nuts 94 threadably coupled to the studs 74. The bolts 102 are common hex headed bolts, which are individually receivable by the four elongated slots 58 of the saw arm mount 38 and engageable with the four threaded apertures 50 of the platform 26. Conversely, the studs 74 are individually receivable by the two elongated slots 54 of the saw arm mount 38 and engageable with the two bores 52 of the platform. While four bolts 102 and two studs 74 are described herein, other embodiments may include greater or fewer bolts 102, studs 74, and nuts 94 in the adjustment mechanism 70.

Each stud 74, best illustrated in FIG. 6, includes a first end 78 received in one of the bores 52 of the platform 26, and a second end 82 eccentrically positioned relative to the first end 78. The second end 82 of the stud 74 includes a hex opening 84 for receiving a tool to facilitate rotating the stud 74. The second end 82 also threadably receives the nut 94 for at least partially securing the saw arm 18 to the platform 26. The first end 78 of the stud 74 is centered on a first axis 86, whereas the second end 82 is centered on a second axis 90 parallel and offset from the first axis 86. The stud 74 further includes an intermediate portion 98 interposed between the first end 78 and the second end 82 of the stud 74. The intermediate portion 98 is concentric with the first end 78, and is operable as a cam surface. As best illustrated in FIGS. 4 and 6, a spacer 100 is interposed between the intermediate portion 98 and the shoulder 66 such that the intermediate portion 98 is spaced away from the shoulder 66.

To assemble the saw arm 18 to the base 14, an operator inserts each stud 74 supporting the spacer 100 into respective bores 52 of the platform 26. An operator proceeds to position the bottom surface 42 of the saw arm mount 38 coincident to the platform 26 of the base 14. Once the bottom surface 42 is abutting the platform 26, the two elongated slots 54 are aligned with the bores 52, and the four elongated slots 58 are aligned with the apertures 50. At this point, each stud 74 is individually extending through each of the two elongated slots 54 and protruding beyond the top surface 46 of the saw arm mount 38 such that the threads of the second end 82 are exposed (FIG. 4). Subsequently, each nut 94 is threadably engaged with the second end 82 of each stud 74 to partially secure the saw arm 18 to the base 14. The saw arm 18 is further secured to the base 14 once each one of the four bolts 102 is individually inserted through each of the four elongated slots 58 and received by the respective apertures 50.

The adjustment mechanism 70 is utilized to adjust the position and orientation of the cutting blade 20 relative to the base 14. Depending on the orientation and position of the cutting blade 20 relative to the base 14, adjusting the cutting blade 20 may include at least one of translating the cutting blade 20 to a third plane parallel to the second plane and pivoting the saw arm 18 to change the yaw of the cutting blade 20 relative to the second plane, thereby pivoting the cutting blade 20 about the vertical axis 23. It should be noted that an adjustment of the cutting blade 20 from the second plane to the third plane also moves the cutting blade axially in a direction parallel to the axis on which the table moves. Axial movements may also occur when the cutting blade 20 is pivoted about the vertical axis 23 such that the yaw of the cutting blade 20 is adjusted. Once the two studs 74 of the adjustment mechanism 70 are received in respective elongated slots 54 and bores 52, the stud 74 can be rotated in direction 72 via a tool engaging the hex opening 84 to move the stud 74 between a first adjustment position and a second adjustment position to correspondingly adjust the position and orientation of the cutting blade 20. As shown in FIG. 7, rotation of the stud 74 in direction 72 causes the intermediate portion 98 to apply a force normal to the inner periphery of one of the two elongated slots 54. Thus, the saw arm 18 correspondingly moves in the same direction as the applied force. Meanwhile, the bolts 102 that are individually received within one of the four elongated slots 58 assist in guiding the directional translation of the saw arm 18. The extent of which the saw arm 18 is capable of translating is dependent on the length of the four elongated slots 58 and/or the diameter of the intermediate portion 98. For example, if the diameter of the intermediate portion 98 is larger than the illustrated embodiment, the extent of which the saw arm 18 is capable of translating is corresponding greater. As illustrated in FIG. 5, two studs 74 are employed at opposite ends of the saw arm 18. If both of the studs 74 are adjusted in a similar manner, the plane in which the cutting blade 20 rotates will translate to a new parallel plane (e.g., the third plane). However, if the studs 74 are adjusted differently, the new rotating plane of the cutting blade 20 will not be parallel to the prior rotating plane.

The embodiment described above and illustrated in the figures are presented by way of example only and are not intended as a limitation upon the concepts and principles of the present invention. As such, it will be appreciated that various changes in the elements and their configuration and arrangement are possible without departing from the spirit and scope of the present invention.

The invention claimed is:

1. A tile saw comprising:
 a base;
 a table movably coupled to the base and moveable along a longitudinal axis between a first position and a second position to cut a workpiece;
 a blade assembly having a saw blade to cut the workpiece as the table moves between the first position and the second position;
 a support arm fixedly coupling the blade assembly to the base via a support arm mount; and
 an adjustment mechanism received by the support arm mount and the base, the adjustment mechanism is movable between a first adjustment position and a second adjustment position to adjust the position of the saw blade relative to the base,
 wherein adjusting the saw blade includes at least one of translating the saw blade in a direction transverse to the longitudinal axis or pivoting the support arm about a vertical axis transverse to the longitudinal axis to change the yaw of the saw blade.

2. The tile saw of claim 1, wherein the adjustment mechanism includes a stud having a first end threadably received in an aperture of the base about a first axis, and a second end eccentrically positioned relative to the first end about a second axis parallel to the first axis.

3. The tile saw of claim 2, wherein the second end of the stud threadably receives a nut for at least partially securing the support arm to the base.

4. The tile saw of claim 2, wherein the stud includes an intermediate portion between the first end and the second end, the intermediate portion being concentric with the second end.

5. The tile saw of claim 4, wherein the intermediate portion is received and engageable with the support arm mount.

6. The tile saw of claim 5, wherein the support arm mount includes an elongated slot aligned with the aperture of the base, the elongated slot is engageable with and receives the intermediate portion of the stud.

7. The tile saw of claim 6, wherein the position of the saw blade adjusts in response to rotation of the stud from the first adjustment position to the second adjustment position when the stud is received in the elongated slot.

8. The tile saw of claim 7, wherein the intermediate portion imparts a force normal to the inner periphery of the elongated slot in response to the stud rotating from the first adjustment position to the second adjustment position.

9. The tile saw of claim 7, wherein the elongated slot is a first elongated slot extending in a first direction, and the support arm mount includes a second elongated slot extending in a second direction perpendicular to the first direction.

10. The tile saw of claim 9, wherein the first direction of the first elongated slot is parallel to the longitudinal axis.

11. The tile saw of claim 9, wherein the adjustment mechanism includes a bolt received in the second elongated slot and a second aperture of the base aligned with the second elongated slot, the bolt guides the support arm as the bolt translates relative to the second elongated slot when the stud rotates from the first adjustment position to the second adjustment position to move the support arm.

12. A tile saw comprising:
 a base;
 a table movably coupled to the base and moveable along a longitudinal axis between a first position and a second position to cut a workpiece;
 a blade assembly having a saw blade rotatable to cut the workpiece as the table moves between the first position and the second position;
 a support arm for supporting the blade assembly relative to the base;
 a support arm mount of the support arm to fixedly couple the blade assembly to the base;
 a first elongated slot extending in a first direction through the support arm mount;
 a stud received by and rotatable within the first elongated slot and the base, the stud is moveable between a first adjustment position and a second adjustment position to adjust the position of the saw blade with respect to the base;
 a cam surface of the stud configured to impart a force to the inner periphery of the first elongated slot when rotated;
 a second elongated slot through the support arm mount extending in a second direction perpendicular to the first direction;
 a bolt received by the second elongated slot and the base, the bolt translates relative to the second elongated slot to facilitate guiding the movement of the blade assembly with respect to the base.

* * * * *